United States Patent [19]
Rudin et al.

[11] Patent Number: 5,644,513
[45] Date of Patent: Jul. 1, 1997

[54] SYSTEM INCORPORATING FEATURE-ORIENTED SIGNAL ENHANCEMENT USING SHOCK FILTERS

[76] Inventors: Leonid I. Rudin, 1734 Grevelia Ave., Apt. A, South Pasadena, Calif. 91030-2736; Stanley Osher, 426 Lincoln Blvd., Santa Monica, Calif. 90402

[21] Appl. No.: 49,637

[22] Filed: Apr. 16, 1993

Related U.S. Application Data

[63] Continuation of Ser. No. 815,548, Dec. 27, 1991, abandoned, which is a continuation of Ser. No. 456,120, Dec. 22, 1989, abandoned.

[51] Int. Cl.$^6$ .............................. G06K 9/40; G06K 9/44
[52] U.S. Cl. ................................ 364/572; 382/266
[58] Field of Search .................... 364/570, 572, 364/574; 367/24, 43, 100; 395/128; 382/22, 54, 266, 269

[56] References Cited

U.S. PATENT DOCUMENTS

| | | | |
|---|---|---|---|
| 4,752,916 | 6/1988 | Loewenthal | 367/24 |
| 4,754,282 | 6/1988 | Edelblute et al. | 342/417 |
| 4,783,840 | 11/1988 | Song | 382/54 |
| 4,852,068 | 7/1989 | Track | 367/43 |
| 4,855,943 | 8/1989 | Lewis | 364/570 X |
| 4,910,716 | 3/1990 | Kirlin et al. | 367/24 |
| 4,918,633 | 4/1990 | Sullivan | 364/574 |
| 4,945,502 | 7/1990 | Kwon et al. | 364/574 |
| 5,185,809 | 2/1993 | Kennedy et al. | 382/6 |

OTHER PUBLICATIONS

"Nonlinear Image Restoration: What We Have Learned," SPIE, vol. 264, Applications of Digital Image Processing to Astronomy, 1980, pp. 148–155, Donald C. Wells.
"Image Enhancement," Fundamentals in Computer Visison, ed. O.J. Fougeros, 1983, pp. 56–57, Grunlund, G.M., H. Knutsson and R. Wilson.
"Restoring With Maximum Likelihood and Maximum Entropy," J. Opt. Soc. Am. 62, 1972, 511–518, B.R. Fieden.
"Digital Removal of Random Media Image Degradation by Solving the Diffusion Equation Backwards in Time," Siam J. Numer. Anal., vol. 15, No. 2, 1978, pp. 344–367, A. Carasso, J. Sanderson, J. Hyman.
"Theory of Edge Detecting," Proc. Roy. Soc. London, B.207 (1980) pp. 187–2170), Marr, D. and Hildreth, E.
"Digital Step Edges from Zero Crossings of Second Directional Derivatives," IEEE Transac. P.A.M.I., VI, PBM-6, No. 1 (Jan. 1981) pp. 58–68, R. Haralich.
"Images: Numerical Analysis of Singularities and Shock Filters," Computer Science Dept., California Inst. of Tech., Pasadena, No. 5250:TR, L. Rudin (1987).
"Digital Image Restoration," Prentice–Hall, Englewood Cliffs, N.J., 1977, H.C. Andres and B.R. Hunt.
A. I. Volpert, "The Spaces of BV and Quasilinear Equations," Math. USSR–Sbornik, V. 73 (115), 1967, No. 2, pp. 225–267.
UCLA CAM Report 89/02 (Jan. 1989).

*Primary Examiner*—Michael Zanelli
*Attorney, Agent, or Firm*—Michaelson & Wallace

[57] ABSTRACT

A method and apparatus for enhancing signals such as images, speech, remotely sensed data, medical, tactile, radar and audio. It proceeds by the construction of certain discrete approximations to certain nonlinear time-dependent partial differential equations. These approximations preserve the variation of the discrete solution as discrete time increases for one space dimension. The approximate solutions satisfy certain maximum principles in one and two dimensions. Thus, the method enhances images and other general signals without being plagued by the phenomenon of ringing near edges and other features, or by smearing of these edges and other features, typical of the prior art. As discrete time increases the signal is enhanced. The process may reach steady state, but for some applications, the dynamical procedure is important. The method is fast, requiring only local operations on a special purpose computer described herein.

18 Claims, 4 Drawing Sheets

SYSTEM INCORPORATING FEATURE-ORIENTED SIGNAL ENHANCEMENT USING SHOCK FILTERS

This is a continuation of application Ser. No. 07/815,548 filed Dec. 27, 1991, now abandoned, which is a continuation of application Ser. No. 07/456,120 filed Dec. 22, 1989, now abandoned.

TECHNICAL FIELD

This invention relates to a system and method for the enhancement of signals in order to increase their usefulness for human inspection (e.g., visual, audio) as well as machine inspection (e.g., computer vision, computer processing of speech). The invention also relates to a system and method whose objective is restoration of the original signal degraded by various blurring systems.

BACKGROUND OF THE INVENTION

The need for signal enhancement arises when the original signal carried certain important features. When this signal is passed or transmitted through a band-limited channel such as an imaging system with limited resolving power or band-limited communication channel, or through turbulent atmosphere, the above-mentioned signal features are destroyed or degraded. Typical examples of such features are edges and lines in visual and radar images as well as various speech features.

Prior art solutions typically fall in two distinct classes. The first class is edge crispening achieved through processing the signal of interest with a high frequency bandpass characteristic. This method almost invariably produces overshoots and undershoots of the original singular features such as edges and lines. For some of the earlier uses of this technique, see L. G. Roberts, "Machine Perception of Three-Dimensional Solids," in Optical and Electro-Optical Information Processing, J. T. Tippett et al., eds. MIT Press, Cambridge, Mass., 1965. The major limitations of the high-pass filtering approach follows from its linear nature. First, it produces unacceptable artifacts in the signal such as ringing (see Donald C. Wells, "Nonlinear Image Restoration: What We Have Learned," SPIE, Vol. 264, Applications of Digital Image Processing to Astronomy, 1980, pp. 148–155) and aliasing, which can hopelessly confuse subsequent machine recognition procedures and produce faulty feature detection results. Secondly, and just as important, the high-pass filter will not distinguish between high-frequency contributions caused by the feature, e.g., each discontinuity producing a $1/\omega$ asymptotic behavior, from the broad spectrum/noise contribution. Thus, the resulting signal is polluted by the explosion of the noise component. Grunlund, G. M., H. Knutsson and R. Wilson in "Image Enhancement," Fundamentals in Computer Vision, ed. O. J. Fougeros, 1983, pp. 56–57, proposed a filter which is a linear contribution of two components—a linear low-pass filter and a linear high-pass filter. The weights of this combination are determined from the local operation amounting to local edge and line detection. This filter is applied to the problem of edge-preserving noise reduction and represents a first attempt to perform a context-sensitive image denoising. However, since this algorithm is basically a linear combination of the two linear filters, it is bound either to create spurious artifacts in images or to blur significant image features.

The second class of solutions falls in the category of signal restoration, e.g., image deblurring or seismic and audio deconvolution. H. C. Andrews and B. R. Hunt in "Digital Image Restoration," Prentice-Hall, Englewood Cliffs, N.J., 1977, is a definitive source for the most important image restoration algorithms in use in today's image-processing applications. Typically, blurring is modeled by the convolution of the original signal with the impulse response (point spread) function of the degradation system.

Basic deblurring methods assume exact knowledge of the blurring kernel. The deconvolution algorithms include direct methods: inverse filtering, Wiener filtering, power spectral equalization, constrained least-squares; and indirect techniques: maximum a posteriori restoration, maximum entropy restoration. For the maximum entropy technique, see B. R. Frieden, "Restoring With Maximum Likelihood and Maximum Entropy," J. Opt. Soc. Am. 62, 1972, 511–518.

The major drawbacks of the above techniques are similar to the shortcomings of the traditional enhancement techniques. The direct techniques linearly trade off bandwidth of the solution with the stability of the inversion process, since deconvolution is a classically ill-posed problem.

The indirect methods are nonlinear regularization procedures which produce smooth solutions. However, such solutions may be of little interest when the object of deblurring is to restore singular features which are essentially nonsmooth functional behavior such as jumps, corners, etc.

In the class of restoration methods, the closest prior art has been proposed by A. Carasso, J. Sanderson, J. Hyman in "Digital Removal of Random Media Image Degradation by Solving the Diffusion Equation Backwards in Time," SIAM J. Numer. Anal., Vol. 15, No. 2, 1978, pp. 344–367. There, the authors treat the problem of restoration by converting the usual convolution integral equation into the backwards heat equation. Then it is observed that this equation is extremely ill-posed, and certain bounds are imposed on the class of possible solutions. The regularized (satisfying these bounds) solution is approximated by solving a backwards beam equation which is well-posed. The solution reliability estimate shows that only partial restoration is possible. The algorithm slows down the noise explosion by recovering the image backwards in time. Thus the method takes a blurred image and derives a noisier but less blurred image. A return to the original zero time will provide totally redundant information. Also, the regularization bounds do not provide restoration of discontinuities or other singular features (e.g. lines) in an artifact-free manner.

A new stable method or procedure is needed in order to restore singular features of signals without numerical contamination by spurious artifacts and with a controlled order of accuracy of the restored singularities.

The subject of this invention is the development of such a stable feature-oriented procedure and apparatus.

SUMMARY OF THE INVENTION

The present invention is a system and method to perform feature-oriented signal enhancement using shock filters. Input signals will include optical and medical images (such as X-ray imaging), audio-speech waveforms, radar measurements, sonar and seismic signals, etc.

The method of the invention, which is a variation-preserving shock filter discrete time evolution procedure, evolves the initial signal dynamically. The procedure may be stopped at any time. The major benefit of this method and its advantage over any previous enhancement method is a robust numerical procedure with real-time software/hardware implementations, which restores singular features of signals without artifact contamination and with a controlled order of accuracy.

To this end, the invention provides an apparatus of preferred embodiment whose block diagram appears on FIG. 1.

The invention comprises a method of performing feature-oriented signal enhancement and bandwidth reconstruction in order to increase the usefulness of the signals for subsequent human analysis or computer information extraction. Input signals which may be processed by this method include: optical input (including multi-spectral), medical (including X-ray, NMR and others), audio-speech waveforms, radar signals, sonargrams, seismic measurement, remote sensing, stock market time series, and tactile measurements for robotic arms. In general this method may process, signals of any nature which can be digitally represented and whose features can be mathematically modeled as some kind of discontinuity or singularity. Signals of arbitrary dimensionality may also be processed by the method of the invention.

The method includes the following steps:

(1) reading the input stability parameter, maximal number of iterations, convergence parameter;

(2) reading input which is an arbitrary dimensional signal array $$\left\{ u \frac{(o)}{x} \right\}$$

where $x=(x_1, x_2, \ldots, x_d)$, and $x_i=0, 1h, 2h, \ldots, Nh$;

(3) transforming the input signal array into the appropriate domain format; e.g., RGB→Y,I,Q and/or $$\left\{ u \frac{(o)}{x} \right\} \to F \left\{ u \frac{(o)}{x} \right\}$$

where F is some kind of transform, e.g., Fourier, Wavelet, etc. The decision for the proper transform depends on the domain in which the discontinuous feature shows up;

(4) computing the edge indicator array corresponding to the chosen signals channel-array in such a way that the edge indicator array changes sign across the feature of the input signal;

(5) scaling the edge indicator array;

(6) creating a transformed new estimate $$\left\{ u \frac{(n+1)}{x} \right\}$$

by the d-dimensional scheme (17), where $d \geq 1$, the 2-dimensional scheme is written as:

$$u_{ij}^{n+1} = u_{ij}^n - \frac{\Delta t}{h} \sqrt{((\Delta_+^x u_{ij}^n)^+)^2 + ((\Delta_-^x u_{ij}^n)^-)^2 + ((\Delta_+^y u_{ij}^n)^+)^2 + ((\Delta_-^y u_{ij}^n)^-)^2} \quad F_{ij}^-(L(u^n))$$

$$- \frac{\Delta t}{h} \sqrt{((\Delta_+^x u_{ij}^n)^-)^2 + ((\Delta_-^x u_{ij}^n)^+)^2 + ((\Delta_+^y u_{ij}^n)^-)^2 + ((\Delta_-^y u_{ij}^n)^+)^2} \quad F_{ij}^+(L(u^n));$$

and the 1-dimensional scheme is given by $$u_i^{n+1} = u_i^n - \frac{\Delta t}{h} \, lm(\Delta_+ u_i^n, \Delta_- u_i^n) |F \left( \frac{\Delta_+ \Delta_- u_i^n}{h^2} \right)$$

(7) applying the convergence test with the convergence parameter $\epsilon$ and checking whether the maximum number of iterations have been performed;

(8) if the convergence test is not satisfied, then repeating steps (4), (5), (6), (7) while storing new and previous information as needed for the next iteration step;

(9) if the convergence step is satisfied, then terminating the process (4)–(8), performing an inverse transform to the transformation in step (3); and

(10) displaying the inverse transform of the last iteration on the output device.

The use of this method, proceeding from the initial input signal through the dynamic edge-developing process, achieves an artifact-free reconstruction of discontinuities and other features. Thus, the invention is a special purpose system for enhancing and restoring a signal's singular features partially lost or weakened by a degradation process of a band-limited nature. The enhancement and restoration are free from artifacts and ringing.

Apparatus for performing the shock filtering according to the present invention includes:

1) a data collection subsystem;

2) a special purpose signal/image processor subsystem; and 3) a data utilization subsystem.

The data collection subsystem performs the steps of:

1) transmitting the input signals through the sensor (which may be a CCD array, microphone, seismo device, sonar, radar etc., or may be various other information signal gathering devices) or memory storage;

2) transmitting these signals through the analog-to-digital convertor (previously digitized signals are directly received from a digital input interface); and 3) inputting the digitized input to a dedicated read/write memory (referred to as the input frame buffer)

The signal/image processor subsystem includes:

1) a format convertor, which is a special purpose signal processor performing desired format conversion;

2) an initial frame and working frames, which constitute specially allocated memory for the real-time interaction with digital signal processor (DSP) unit. These frames are transmitted into the DSP bus which communicates with DSP and edge detector units;

3) the DSP unit, which is the special purpose digital signal processor (or may be implemented by a digital computer, VLSI device, or array of processors), and which executes instructions from a control store;

4) the Edge Detector unit, which is a special purpose computing device providing DSP with the feature measurements according to the Shock Filter theory developed herein;

5) The Control Store unit, which is a ROM or RAM device storing the above-mentioned instructions for the Shock Filter scheme;

6) Data Registers and Host Communications Interface which are in communication with the DSP, with the Host Communication Interface directing the DSP unit's operations such as start, stop, modification of the operation code, etc.;

7) a Final Frame which constitutes specially allocated memory (like the Initial Frame and the Working Frames);

8) an Output Format Converter for restoring the initial format (by transmitting the Final Frame through the Output Format Converter).

The DSP, Edge Detection and Control Store units carry out the computational scheme defined by the flow chart of FIG. 1.

The Data Utilization subsystem herein includes:

1) an Output Frame Buffer, which is a dedicated read/write memory having an input for receiving newly converted Final Frame from the Output Format Converter;

2) a Switch unit for redirection of the signal either to a digital-to-analog convertor or a Digital Output Interface;

3) the Digital Output Interface Unit, which may serve for further digital storage and/or communications;

4) an Output Device, which is for the cognitive perception (visualization) of the enhanced/restored signal.

As will be understood from the detailed description below, the method and apparatus of the invention have many possible variations for processing a variety of signals.

DETAILED DESCRIPTION

Figure 1:
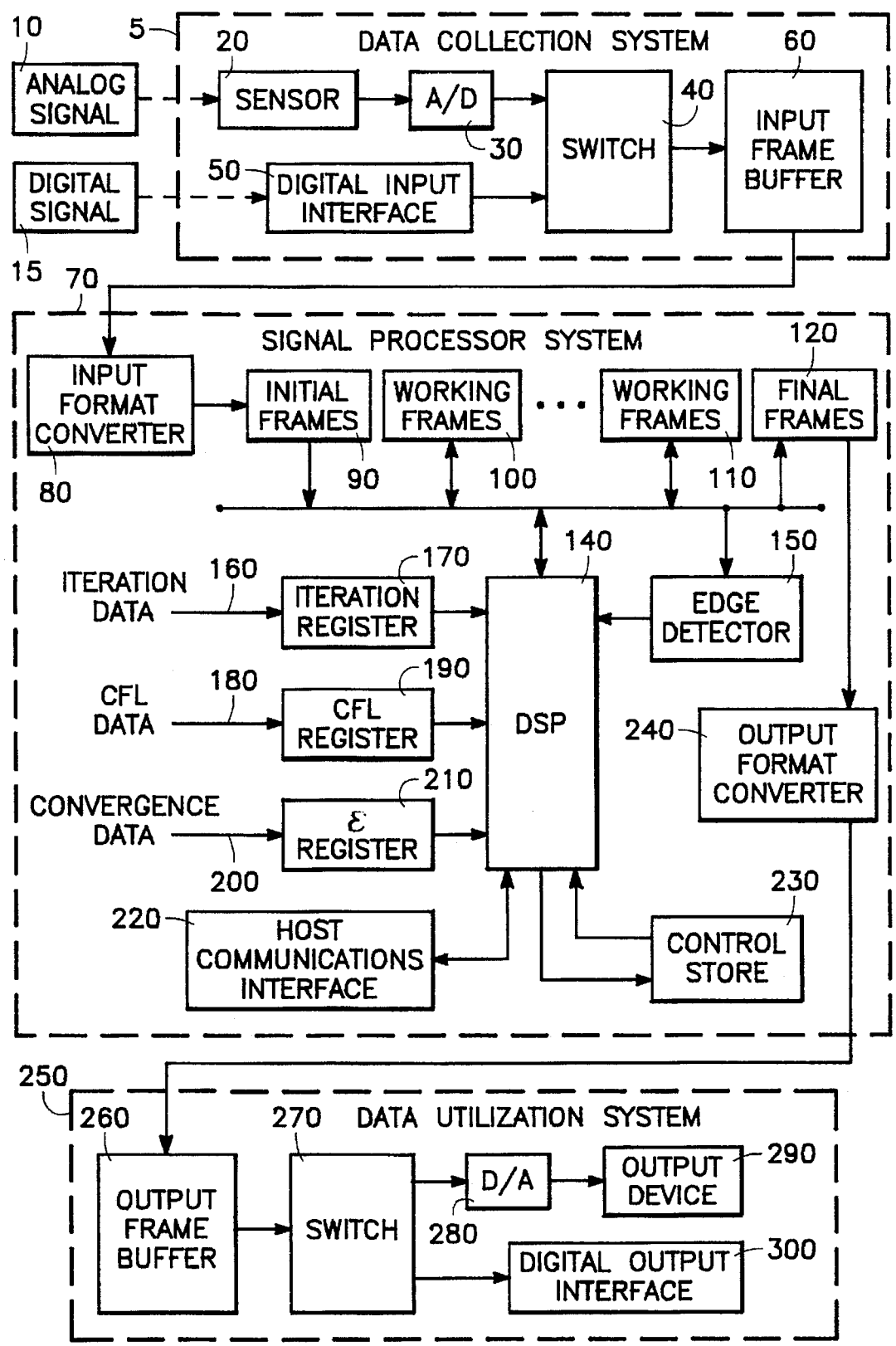
FIG. 1 is a block diagram of the apparatus performing the shock filter method in accordance with the Detailed Description that follows.

The newly constructed method for enhancing curves and images will first be discussed; thereafter the use of this method in technology involving the enhancement of more general signals will be taken up, particularly discussing the methods depicted in FIGS. 1 and 2.

It is necessary to observe that this new method bridges the gap between two above-mentioned general classes of enhancement methods: sharpening via high-pass filter and restoration via deconvolution. On one hand, the proposed procedure in its chosen embodiment restores sharp discontinuities (such as edges) and does not require a priori knowledge of the blurring process (only the fact that it is of finite duration impulse response). Thus, it could be classified as a sharpening procedure. However, it is of far superior performance to the previous art since the shock filter is the only enhancement method which does restore discontinuities exactly and without any parasitic Gibbs oscillations.

On the other hand, since as stated below, the shock filter performs an approximate deconvolution in the class of piece-wise continuous signals and produces an exact deconvolution in the case of piece-wise constant signals (such as Morse code or alphanumerical fax signals), it may be also classified as a restoration filter. Again, here the shock filter achieves greatly improved results compared to the previous art because of its ringing free analytical and numerical construction.

We begin by considering the equation $$u_t = -|u_x| F(u_{xx}) \tag{1a}$$

to be solved for all $x$, $t \geq 0$ with initial data:

$$u(x,0) = u_o(x). \tag{1b}$$

Here the function F satisfies (i) $F(0) = 0$ (ii) $X(u) F(u) > 0$, $u \neq 0$ \hfill (1c)

where $X(u)=1$ if $u>0$; $X(u)=-1$ if $u<0$; and $X(0)=0$.

An example is:

$$u_t = -|u_x| u_{xx} \tag{2}$$

Here, $u_o(x)$ is the initial curve to be enhanced, and $u(x,t)$ is the dynamic enhancement procedure through this shock filter. The processed quantity is the limit as $t \to \infty$ of $u(x,t) = u_\infty(x)$. This looks at first like an extremely ill-posed problem. The coefficient of $u_{xx}$ is never positive. In fact, it is negative except at extrema of $u$, where it vanishes. The discrete approximation to this initial value problem turns out to satisfy the following a priori estimates (which are true for (1a) with general F satisfying (1c)).

(i) TV $u(\cdot,t)$=TV $u_o(\cdot)$ (ii) max $u(\cdot,t)$=max $u_0(\cdot)$ (iii) min $u(\cdot,t)$=min $u_o(\cdot)$ \hfill (3)

Here, TV=total variation in the sense of, e.g., the article by A. I. Volpert, "The Spaces of BV and Quasilinear Equations," Math. USSR-Sbornik, v. 73(115), 1967, No. 2, pp. 225-267.

The intuitive reason for the validity of these estimates is as follows. The solution to (1a) stays smooth initially at smooth extrema. Thus, since $u_x$ vanishes at these points, $u_t$ also vanishes and maxima and minima stay invariant in time. We are committed to variation preservation as a constraint on solutions of (2) in particular, and (1a) in general.

We can best exemplify the behavior of this enhancement procedure by taking the case $F(u)=X(u)$.

Then u satisfies:

$$u_t = \pm u_x \text{ if } u_{xx} \neq 0 \tag{4a}$$

$$u_t = 0 \text{ if } u_{xx} = 0 \tag{4b}$$

We thus have a simple linear advection equation in which the direction of propagation changes sign or becomes zero at extrema and at inflection points of u. An interesting example comes from taking (depicted in FIG. 3(A)):

$$u_o(x) = \cos x \tag{4c}$$

Then:

$u(x,t)=\cos(x-t)$ for $t<x<\pi/2$ $u(x,t)=1$ for $-t<x<t$ $u(x,t)=\cos(x+t)$ for $-\pi/2<x<-t$ \hfill (5a)

Figure 3A:
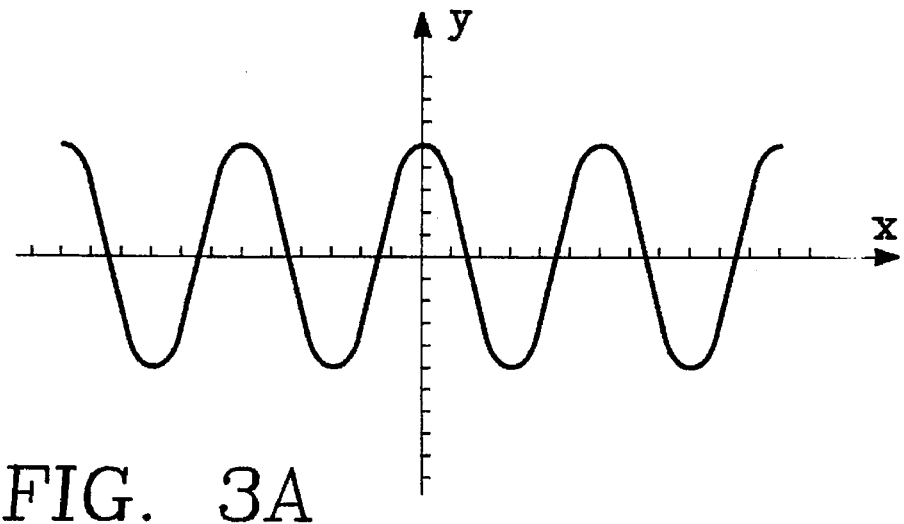
FIGS. 3(A)-3(C) are plots of the dynamic curve enhancement of the periodic function by the shock filter described below.
Figure 3B:
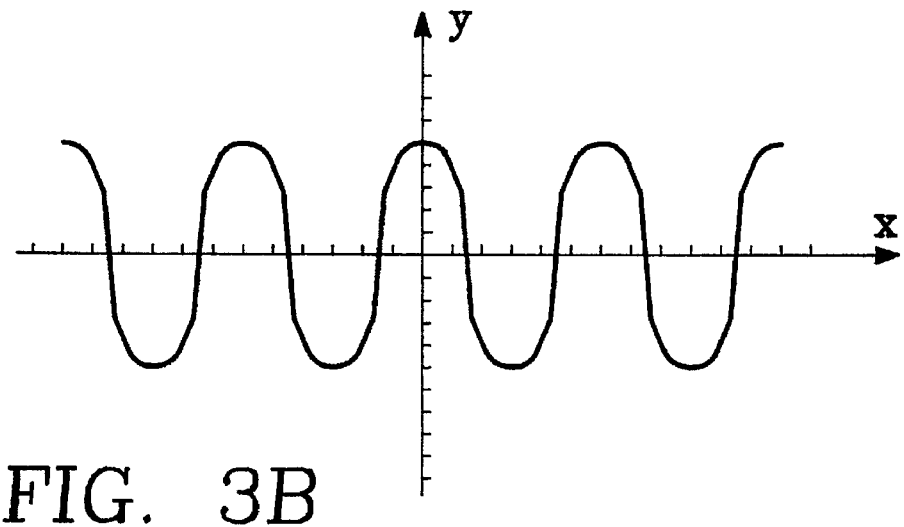

By symmetry, discontinuities develop at $x=(2k+1)\pi/2$, $k=0,\pm 1,\pm 2 \ldots$, as seen in FIG. 3(B).

Figure 3C:
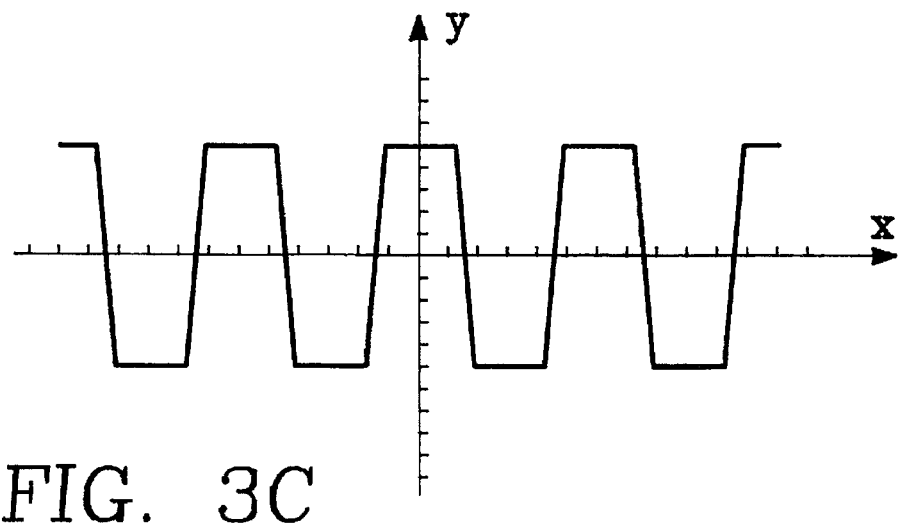
Figure 4A:
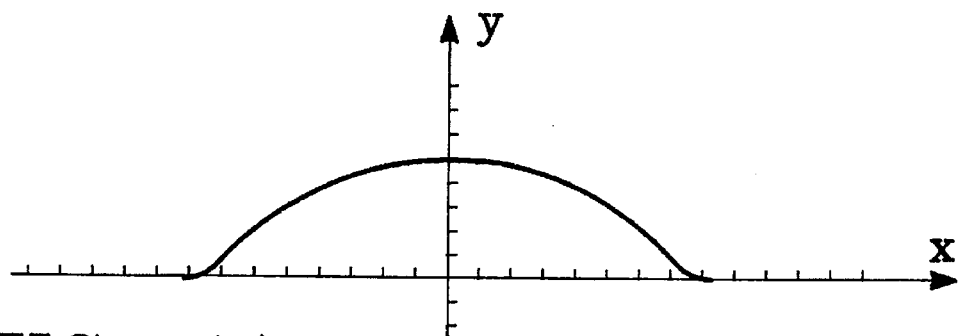
FIGS. 4(A)-4(D) depict plots of the edge-developing process produced with the shock filter.
Figure 4B:
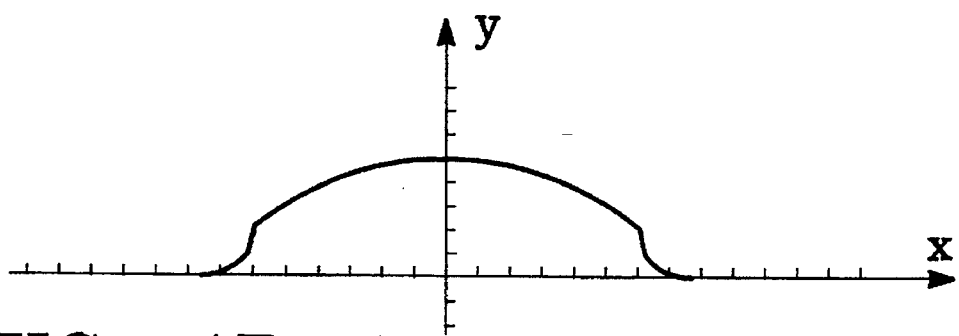
Figure 4C:
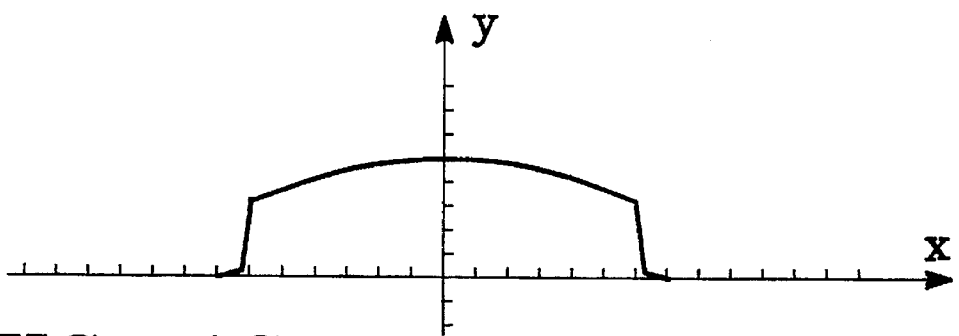
Figure 4D:
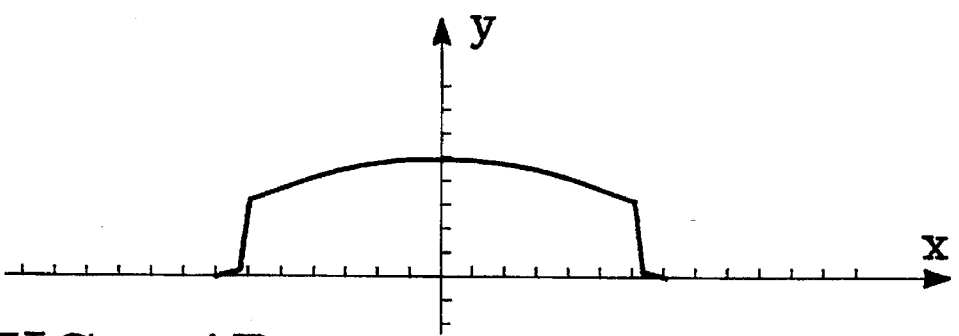

Finally, at $t=\pi/2$ and for all $t>\pi/2$, the enhanced image is shown in FIG. 3(C), and $u_\infty = (-1)^k$ for $(2k-1)\pi/2 < x < (2k+1)\pi/2$. (5b)

To show that the transformation $$u_o \to u_\infty$$

is an approximate deconvolution, we consider what it does to convolution of a step function by $j\delta(x)$ as defined by $$j(x) = j(|x|),$$ (6)

where $j(x)$ is strictly decreasing with $|x|$, for $|x|<1$ $$j(x) \geq 0 \text{ if } |x| \geq 1$$

$$j \in C^\infty$$

Then consider for any $\delta > 0$ $$j\delta = \frac{1}{\delta} j\left(\frac{|x|}{\delta}\right)$$

We call $j\delta$ a "mollifying" kernel.

Let $w(x)$ be a step function with values $$w(x) \equiv w_\nu \text{ in } I_\nu = \{x/x_{\nu-\frac{1}{2}} \leq x \leq x_{\nu+\frac{1}{2}}\}$$ (7)

where the real line is the union of all these intervals $I_\nu$. Let $0 < d = \inf_\nu \{x_{\nu+\frac{1}{2}} - x_{\nu-\frac{1}{2}}\}$
Finally, take $0 < \delta < d/2$ be given.
Define:

$$u_0 = j_\delta * w$$

Then, we have: If $F = X$ in (1a), then the transformation $u_o \to u_\infty$ with $u_0 = j_\delta * w$ for $\delta < d/2$ yields $u_\infty = w$ where $w$ is the step function defined in (7). Thus the shock filter is an exact deconvolution in this case. The proof was given in S. Osher, L. I. Rudin, UCLA, CAM Report 89-02 (January 1989), a copy of which is submitted herewith and is incorporated herein by reference.

We now set up a discrete approximation to (1a) which preserves the variation and the size and location of extrema. We approximate (1a) by first setting up GRID $x_i = ih$; $t^n = n\Delta t$; $n = 0, 1, \ldots$; and $i = 0, 1, 2, \ldots, N$, with $Nh = 1$. The equation (1a) is to be approximately solved for $0 \leq x \leq 1$, and $t > 0$, with boundary conditions approximating $u_x = 0$, $x = 0$, $x = 1$.

The approximation is $$u_i^{n+1} = u_i^n - \frac{\Delta t}{h} \, |m(\Delta_+ u_i^n, \Delta_- u_i^n)| F\left(\frac{\Delta_+ \Delta_- u_i^n}{h^2}\right)$$ (9a)

where $i = 1, 2, \ldots, N-1$. Here $m(x,y)$ is the minmod function defined by $$m(x,y) = \begin{cases} (\text{sign } x)\min(|x|,|y|) & \text{if } xy > 0 \\ 0 & \text{if } xy \leq 0 \end{cases}$$ (9b)

See, e.g., S. Osher, L. I. Rudin, UCLA CAM Report 89-02 (January 1989).

$$\Delta_\pm u_i = \pm(u_{i\pm 1} - u_i)$$ (9c)

with boundary conditions $$u_0^n = u_1^n, \; u_{N-1}^n = u_N^n \text{ for all } n \geq 0$$ (9d)

and initial conditions $$u_i^0 = u_0(ih), \; i = 1, 2, \ldots, N-1$$ (9e)

We require $$\sup \frac{\Delta t}{h} |F_i^n| \leq \frac{1}{2}$$ (9f)

Let:

$$\max(x,0) = x^+$$

$$\min(x,0) = x^-$$ (10)

Then it turns out that we may rewrite (9a) equivalently as $$u_i^{n+1} = u_i^n - \Delta \frac{t}{h} \sqrt{((\Delta_+ u_i)^+)^2 + ((\Delta_- u_i)^-)^2} \quad (F_i^n)^-$$ (11)

$$- \Delta \frac{t}{h} \sqrt{((\Delta_+ u_i)^-)^2 + ((\Delta_- u_i)^+)^2} \quad (F_i^n)^+$$

In UCLA CAM Report 89-02 (January 1989) we proved that the scheme (9), or equivalently (11), is TVP (total variation preserving), i.e., $$\sum_{i=0}^{N-1} |\Delta_+ u_i^{n+1}| = \sum_{i=0}^{N} |\Delta_+ u_i^n|$$ (12a)

and also local extrema remain unchanged from n to n+1, i.e., $$\Delta_+ u_i^n \cdot \Delta_- u_i^n \leq 0 \to \Delta_+ u_i^{n+1} \cdot \Delta_- u_i^{n+1} \leq 0$$ (12b)

Finally, minimum $(u^n_{i-1}, u^n_i, u^n_{i-1}) \leq u^n_{i+1} \leq$ maximum $(u^n_{i-1}, u^n_i, u^n_{i-1})$ FIGS. 3(A)–3(C) demonstrate the enhancement procedure applied to the function $y = \cos(x)$. The evolution procedure, with stationary inflection points, which correspond here to zeros of the function, eventually produces a steady state which is a "square wave".

Propagation of the Edge Enhancement

The principle by which the invention functions may be seen by considering, for example, how the one-dimensional implementation of Equation 11 operates, as applied to the example of the cosine wave of FIG.'s 3. The following discussion is based upon an analysis of Equation 11 using the simplest calculus principles. Conceptually, a new image is constructed with each iteration of the step of block 390 of FIG. 2 by changing the amplitude $u_i$ of each pixel in accordance with the difference between it and its neighbor pixel (e.g., $\Delta_+ u_i$ in Equation 11) and in accordance with an edge detection function, such as the second derivative of the signal (e.g., $F_i^n$ in Equation 11) Each edge of the cosine wave of FIG. 3 is a zero-crossing and is identified by a change in sign of $F_i^n$.

Each and every pixel $u_i$ is nearest some edge and has two adjacent neighbor pixels, namely a neighbor on the side nearest that edge and a neighbor on the opposite side. Equation 11 is constructed such that the difference employed in computing the change to $u_i$ is always between the pixel $u_i$ and the neighbor pixel away from the edge, so that edge enhancement propagates towards and up to the edge but never crosses the edge. Whether the change to $u_i$ is a decrease or increase in amplitude is determined by the sign of $F_i$. In the present example, $F_i$ is $-\cos(x)$, the second derivative of $\cos(x)$, and its sign changes at each zero-crossing. Since the term including $F_i$ is subtracted from the previous value of $u_i$ in Equation 11, pixels in positive regions of the cosine image are increased in value while pixels in negative regions are decreased.

How the propagation of the edge enhancement away from each edge is implemented in Equation 11 will now be explored in detail. Attention is directed to the definition of the superscript + and superscript − notation in Equation 10, denoting the exclusively positive and exclusively negative terms of a function, as in $(F_i^n)^+$ and $(F_i^n)^-$, respectively.

In any positive region of the cosine wave image (e.g., between $x=3\pi/2$ and $x=5\pi/2$), $F_i$ is negative, so that only the term in Equation 11 having $(F_i^n)^-$ as a coefficient is non-zero ($(F_i^n)^+$ being zero in this region. This non-zero term includes only positive values of $\Delta_+ u_i = u_{i+1} - u_i$ (denoted as $(\Delta_+ u_i)^+$ in Equation 11) and only negative values of $\Delta_- u_i = -(u_{i-1} - u_i)$ (denoted as $(\Delta_- u_i)^-$). As a result proceeding from "right" to "left" in this positive region (i.e., from $x=3\pi/2$ to $x=2\pi$) along the upward-sloping wave, only the differences $(\Delta_+ u_i)^+$ between each pixel and its neighbor to the "left" (i.e., away from the edge at $x=3\pi/2$) are employed, all other factors in this term being zero. Continuing further to the "right" along the downward sloping wave (i.e., from $x=2\pi$ to $x=5\pi/2$), only the differences $(\Delta_- u_i)^-$ between each pixel and its neighbor to the "right" (i.e., away from the edge at $x=5\pi/2$) are employed, all other factors in this term being zero. No differences across any edge are computed, thus avoiding any blurring or ringing of the edge. This advantage is inherent in Equation 11 because, upon inspection, all of the differences fail to meet the sign requirements of Equation 11 when evaluated across any edge. As one example, $(\Delta_+ u_i)^+$ is zero (i.e., $\Delta_+ u_i$ is negative) in the region in which $(F_i^n)^-$ is non-zero (i.e., where $F_i^n$ is negative) adjacent $x=\pi/2$. In this same region, $(\Delta_- u_i)^-$ is zero (i.e., $\Delta_- u_i$ is positive). Thus, all terms in the first square root in Equation 11 are zero near $x=\pi/2$. The same is true regarding the second square root term of Equation 11.

With each iteration of the process, the image is updated with a complete new set of pixels. The differences between neighboring pixels change, information from two pixels away affecting computations involving the current pixel due to changes in the previous iteration. Thus, successive iterations cause edge enhancement propagation to progress across the entire image (or cosine waveform in the present example). In propagating the edge enhancement changes toward each of the edges (without crossing the edges) over successive iterations, the time progression of the changes to the image behave like a shock wave, and hence the operation of Equation 11 is referred to as a shock filter in this specification.

In summary, edge enhancement—i.e., updating of amplitudes of all pixels in the image—propagates across the image towards and up to each edge from all sides of the edge. In the one-dimensional case of Equation 11, amplitude changes are toward the maximum or minimum, amplitudes, respectively, on respective sides of all edges. In multi-dimensional cases, however, the amplitudes are determined in a more complex manner by the final condition of the steady state.

The present invention has the advantage that the total variation in each neighborhood and of the entire image is conserved, guaranteeing edge enhancement with the highest fidelity to the original image.

Another unique feature of the invention is that the operation of Equation 11 reaches equilibrium at some point at which all pixels near edges have reached respective maximum or minimum values characteristic of the corresponding edges, for the one-dimensional case. This occurs because at this point all of the difference terms in Equation 11 have become at least nearly zero or below a predetermined threshold. (In the multi-dimensional case, equilibrium is reached upon reaching pixel values corresponding to the final condition of the steady state.) Thus, the invention automatically selects the number of iterations corresponding to the optimum edge-enhanced image.

Extension to Multi-Dimensional Images

The invention is applicable to multi-dimensional images (such as two-dimensional images). Equation 17 is the preferred implementation of the invention as applied to enhancing a two-dimensional image. Comparing Equation 17 of the two-dimensional case with Equation 11 of the one-dimensional case discussed at length above, it is readily seen that the same computations are employed but that the respective positive and negative terms of the forward and backward differences are computed along all dimensions (e.g., along both the X and Y axes in Equation 17). For this purpose, in Equation 17 each of the forward and backward difference operators has either an x or y superscript denoting one of the two dimensions, while each pixel as two subscripts corresponding to the two dimensions. In the multi-dimensional case of Equation 17, the sums of absolute values of these terms are grouped appropriately and multiplied by the respective positive and negative terms of the edge detection function in the same manner as in Equation 11.

In general, the foregoing computation constitutes computing a sum of absolute values of positive terms of the forward differences and negative terms of the backward differences and multiplying the sum by negative terms of the edge detection function, and also computing a sum of absolute values of negative terms of the forward differences and positive terms of the backward differences and multiplying the latter sum by positive terms of the edge detection function. The resulting products are then combined and added to the old pixel value.

The edge detection function, which can be a second derivative in Equation 11, is preferably a component of a Laplacian operator (i.e., a finite difference approximation of the normal component of a Laplacian operator) in the two-dimensional case of Equation 17.

The sequence in FIGS. 4(A)–4(D) demonstrates that the edge development process is not necessarily producing smooth wave forms culminating in a piecewise constant function, but also that breaks in derivatives ("kinks") do develop. The edge indicator $F(L(u))$, which is a generalization of $F(u_{xx})$ in equation (1a) of this example, was taken to be $$F = \text{sign}(\Delta_+ \Delta_- u_i^n) \quad (13)$$

We observe (in FIGS. 3 and 4, for example) that the transformation is a continuous process. The transitory solution is of interest in the enhancement of one-dimensional speech-wave forms.

We next consider the equation $$u_t = -\sqrt{u_x^2 + u_y^2}\ F(L(u)) \quad (14a)$$

to be solved for all x,y, and for $t \geq 0$, with initial data $$u(x,y,0) = u_0(x,y) \quad (14b)$$

Here $F(u)$ satisfies (1c). Also $L(u)$ is a second order, generally nonlinear elliptic operator acting as an edge detector; see, e.g., UCLA CAM Report 89/02 (January 1989).

The general idea for the construction of the multidimensional shock filter is as follows. In both of the equations (1a) and (14a), we have nonlinear combination of the propagation term: ∇u (the magnitude of the gradient), and an edge indicator term F(L(u)) whose desired behavior involves changing sign across any essential singular feature, such as an edge or a line. Thus the edge formation and sharpening process will occur at the places where $$L(u)=0 \quad (15a)$$

Thus the choice of L(u) is governed by how faithfully the zero crossings of this differential operator define edges of the processed image. This assignment of an edge indicator value to every pixel and using it in conjunction with the propagation term constitutes an edge enhancement technique which is different from conventional image processing techniques, and represents a feature-oriented approach.

The scheme due to D. Mart (well known in computer vision literature; see, e.g., Marr, D., and E. Hildreth, "Theory of Edge Detecting," Proc. Roy. Soc. London, B.207 (1980), pp. 187–2170) works by finding zeros of $$L(u)=\nabla^2(u(x,y)*G(x,y)) \quad (15b)$$

where G(x,y) is a two-dimensional Gaussian. Since the function we are processing has already been blurred, e.g., convolved with a Gaussian, the choice for an edge operator would be $$L(u)=u_{xx}+u_{yy} \quad \text{(the Laplacian)} \quad (15c)$$

A somewhat better version of (15c) is a scheme in which edges are extracted from the zero crossings of second directional derivatives. We shall skip the polynomial approximation, which is given in R. Haralick, "Digital Step Edges from Zero Crossings of Second Directional Derivatives," IEEE Transac. P.A.M.I., VI, PBM-6, No. 1 (January 1984), pp. 58–68, and simply set $$L(u)=u_{xx} \cdot u_x^2 + 2 \cdot u_{xy} u_x u_y + u_{yy} \cdot u_y^2 \quad (15d)$$

which is simply an expression for the second derivative of u in the direction of the gradient.

We finally normalize F(u) by $$\tilde{F}(u) = \frac{F(u)}{1+|F(u)|} \quad (15e)$$

Our enhancement of images procedure takes $u_0(x,y)$, the initial image, and dynamically processes it through a discrete approximation to equation (14a) as described below. The image is continuously enhanced for increasing discrete time.

We approximate (14) by setting up a grid $$x_i=ih_1, y_j=jh_2, t^n=n\Delta t$$

$$i,j=0,\pm 1,\pm 2, \ldots, n=0,1,2, \ldots$$

For simplicity of exposition, we shall take $h_1=h_2=h$. The approximate solution is to satisfy the following:

$$u_{ij}^n = u(ih, jh, n\Delta t)$$

Our first approximation is $$u_{ij}^{n+1} = \quad (16a)$$

$$u_{ij}^n - \frac{\Delta t}{h} \sqrt{(m(\Delta_+^x u_{ij}^n, \Delta_-^x u_{ij}^n))^2 + (m(\Delta_+^y u_{ij}^n, \Delta_-^y u_{ij}^n))^2} \; F_{ij}(L(u^n))$$

Here we have defined $\Delta_\pm^x$ and $\Delta_\pm^y$ to be the forward and backward difference operators in the x and y directions. Also $F_{ij}(L(u))=F(L_{ij}(u))$ where $L_{ij}$ is a discretization of the second order edge detector, using central differencing for $u_{xx}$ and $u_{yy}$, i.e., $$u_{xx} = \frac{1}{h^2} \Delta_+^x \Delta_-^x u_{ij},$$

etc, symmetric differencing for $u_{xy}$ $$u_{xy} = \frac{1}{2h^2}(\Delta_-^x \Delta_-^y + \Delta_+^x \Delta_+^y u)$$

and the $u_x$, $u_y$ terms (if needed) are approximated using the minmod operator.

$$\sup \frac{\Delta t}{h} F_{ij}(L(u^o)) \leq \frac{1}{4} \quad (16b)$$

This is called the CFL restriction.

A slight modification of this scheme comes from $$u_{ij}^{n+1} = u_{ij}^n - \frac{\Delta t}{h} \sqrt{((\Delta_+^x u_{ij}^n)^+)^2 + ((\Delta_-^x u_{ij}^n)^-)^2 + ((\Delta_+^y u_{ij}^n)^+)^2 + ((\Delta_-^y u_{ij}^n)^-)^2} \; F_{ij}^-(L(u^n))$$

$$- \frac{\Delta t}{h} \sqrt{((\Delta_+^x u_{ij}^n)^-)^2 + ((\Delta_-^x u_{ij}^n)^+)^2 + ((\Delta_+^y u_{ij}^n)^-)^2 + ((\Delta_-^y u_{ij}^n)^+)^2} \; F_{ij}^+(L(u^n)) \quad (17)$$

with the same CFL restriction (16b).

Our main rigorous theoretical results concern (17). See UCLA CAM Report 89-02 (January 1989) for proofs.

(A) For (17) let $$M_{ij}^n = \max\{u_{ij}^n, u_{i-1,j}^n, u_{i+1,j}^n, u_{i,j-1}^n, u_{i,j+1}^n\}$$

$$m_{ij}^n = \min\{u_{ij}^n, u_{i-1,j}^n, u_{i+1,j}^n, u_{i,j-1}^n, u_{i,j+1}^n\}$$

Then we have a local maximum principle $$m_{ij}^n \leq u_{ij}^{n+1} \leq M_{ij}^n. \quad (18)$$

In addition, if $L(u_n)$ is such that $L(u^n) \leq 0$ at local discrete maxima $L(u^n) \geq$ at local discrete minima, $\quad (19)$ then these extrema are invariant in time, i.e., the values of $$u^n_{i_0,j_0}$$

at local extrema are the same as the values of $u_{i_0,j_0}^{n+1}$.

We also have: (B) For (16a): If $u_{i_0,j_0}^n$ is a local maximum $$u_{i_0,j_0}^n \geq \max(u_{i_0-1,j_0}^n, u_{i_0+1,j_0}^n, u_{i_0,j_0-1}^n, u_{i_0,j_0+1}^n)$$

then it is not enhanced; in fact, $$u_{i_0,j_0}^{n+1} = u_{i_0,j_0}^n.$$

The same is true for local minima.

We also consider an option which replaced $F_{ij}(L(u^n))$ by $\tilde{F}_{ij}(L(u^n))$ $$\tilde{F}_{ij} = F(m[L_{i+\nu,j+\mu}(u^n)]) \quad (20)$$

$$\nu,\mu=-1,0,1.$$

Thus the processing will leave invariant piecewise continuous approximate solutions of L(u)=0.

In FIG. 1, the block diagram of the apparatus utilizing the shock filtering method is presented. The block diagram of FIG. 1 is comprised of a data collection system 5, a special purpose signal (or image) processor 70, and a data utilization system 250. The imput signal in FIG. 1 may be an image, or it may be of a larger class of input signals (which need not be limited to the field of image processing), such as audio, speech, multispectral images, radar, sonar, seismic trace, facsimile communication signal, instrumentation measurements, etc. The structure of this special purpose computing system follows closely the above method description. However, architectural details shall be made at this stage.

The input values such as analog signal 10 are delivered to the sensor 20 which may be a camera, CCD array, microphone, sonar, radar, seismic device, etc. For an analog input signal, an analog-to-digital conversion is required, and is performed by A/D (analog-to-digital) convertor 30. Various convertors may be used depending on the signal: digitizers, scanners, etc.

If the signal is already digitized, such as digital signal 15, then the input can be received through the digital input interface 50 (which may be a conventional interface). The signal 15 may be from a storage device, digital communication channel, another computer, etc.

The output of the convertor 30 and/or the interface 50 is input to a switch 40, which may be operated by the user and is included to indicate that several different input signal sources can be accommodated: real time, from sensor, or from some general digital source, e.g., magnetic/optic media, communication networks, etc. (If the data is pre-stored data, then the sensor 20 may be omitted.)

An input frame buffer 60, which is a dedicated read/write memory, is connected to the switch 40 and receives the digitized input signal, and is provided to temporarily store the input frames. This completes the data collection stage.

The digitized signal is then output to an input format convertor 80, which generates initial frame (or frames) 90 to be enhanced by converting the signals from the buffer 60 to a desired format chosen by the operator or designer of the signal processor 70. In this embodiment, the conversion is from RGB to Y,I,Q, but many variations are possible, such as conversion to Fourier transform domain or to a wavelength domain or to a multichannel domain. The number of initial frames 90 depends upon the domain chosen; for instance there are three initial frames for the Y,I,Q domain (or there may only be one, if only the Y-channel is processed, for instance), but for a multi-spectral domain there may be numerous such frames. An example of when only the Y-channel is processed is when the user is interested in edge detection only for intensity values; in this case, processing I and Q channels would be superfluous. Any combination of one or more channels may be chosen for processing.

The initial frame 90 is a specially allocated portion of memory, and may include various image transforms, as described above, or, e.g., converting audio or sonar signals to any other more appropriate format. In particular, a wavelet-like transform is one of the possibilities here.

The initial frame 90 receives the converted values, and it may be further subdivided into the working frames 100 and 110 (of which there may be a large number which may be greater than the number of inital frames), which may receive only small neighborhoods of pixels. Like the inital (and final) frames, working frames here are an allocated area of the DSP.

The initial frame 90 as well as working frames 100 and 110 are fed into the DSP 130 bus which communicates with DSP 140 and the edge detector special purpose device 150, which provides an edge indicator value array associated with the signal. Predetermined input parameters (CFL number 180, iteration limit 160, and convergence limit ($\epsilon$) 200) are fed to corresponding registers 190, 170 and 210, respectively. These may be obtained from computer or a storage device, or may be input by an operator.

The DSP processor 140 receives data from the DSP bus 130 and data registers 170, 190 and 210. The DSP 140 is, in the preferred embodiment, a special purpose digital signal processor which accepts and executes instructions stored in the control store 230. DSP 140 may also comprise a digital computer, or specially designed VLSI chip, an array of parallel processors using working frames or PLA implementation. The edge detector processor 150 provides DSP with edge detection measurements from the most recent enhancement iteration, discussed in greater detail below.

The DSP 140 carries out a computational process summarized in the shock filter flow chart, FIG. 2, discussed below. The control store 230 is ROM or RAM which contains instructions to carry out the operations on the flowchart of FIG. 2. The RAM implementation of the control store 230 is used when future and/or reprogramming of the shock filtering scheme may be desired.

Figure 2:
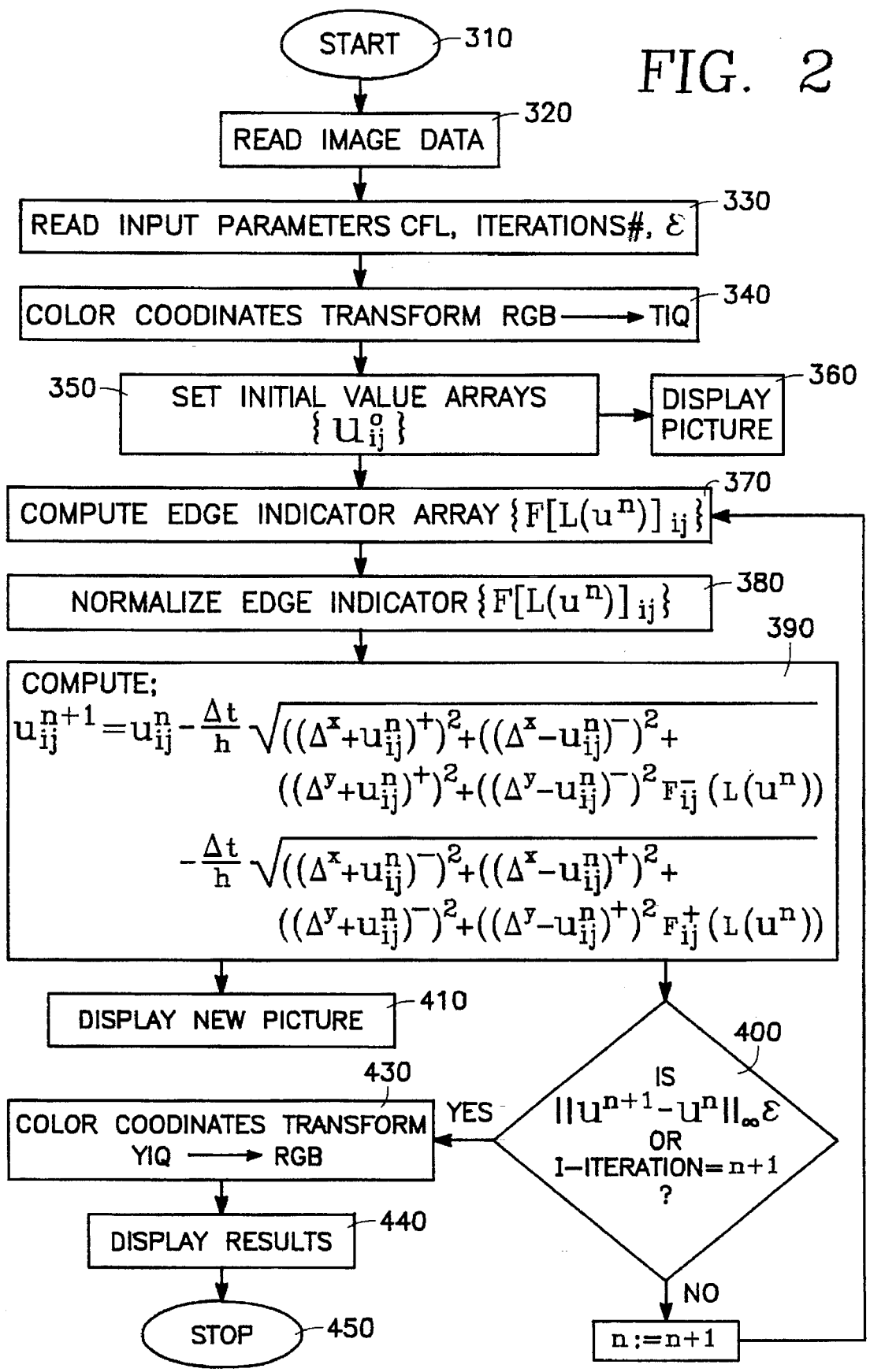
FIG. 2 is a detailed flow chart of the shock filter procedure in accordance with the present invention.

The DSP 140 is provided with the edge detection measurements via the edge detector processor, which dynamically recomputes edge data in each new iteration from the working frames, according to the method stated in the flow chart of FIG. 2.

A host communications interface 220, which may be a computer, is linked to the DSP in order to direct its operations to the method, etc. The registers 170, 190 and 210 and the interface 220 may all be connected to a single computer, if desired.

The DSP output is input to an output format convertor 240, which inverts data from the final frame memory into the initial format. This is essentially the reverse of the process performed by the input format convertor 80.

In general, the operations carried out in the signal processor system may be referred to as the image processor stage, which is described in detail in the discussion of the method of the invention, below.

The data utilization stage of the shock filter takes place in the data utilization system 250. Output frame buffer 260 is a dedicated read/write memory. It receives the reconverted signal from the convertor 240 and sends it to the switch 270. The switch 270 redirects output either to the digital-to-analog (D/A) convertor 280 or to the digital interface 300. If the destination is the D/A convertor 280, then the output device 290 receives and displays the result. The output device may comprise a visual, audio, or tactile (e.g., for a robot or a digitized-fingertip glove) output system. The digital interface 300 is provided for further information storage and/or communication. This completes the data utilization stage of the shock filter developed herein.

Assuming the case of the image input data, the actual flow chart of the proposed computational scheme is depicted in FIG. 2. It can be directly implemented on either sequential or concurrent computer architectures. The method is started (represented by numeral 300), and the image (or other signal) data are read, as at box 320. The computational steps of the method are then as follows:

1. (Box 330) Choose a stability parameter CFL within the limits of convergence; choose the maximum number of iterations of the filter (referred to as "I iterations"); and choose a small convergence parameter $\epsilon$. Read these parameters into the DSP 140 shown in FIG. 1.

2. (Box 340) Transform the color RGB image into the National Television System Committee Coordinate system (NTSC), or into any other color coordinate system desired by the user. Expanding on the applications, other tristimulus conversion formulas may be used. For the NTSC conversion we have:

$$(Y,I,Q) = (R, G, B) * \begin{pmatrix} 0.299 & 0.587 & 0.114 \\ 0.569 & -0.274 & -0.322 \\ 0.211 & -0.523 & 0.312 \end{pmatrix}$$

Notice that it is not necessary to process every tristumulus array. For example, if only luminance features are to be enhanced, then only the Y channel is processed with the shock filter. The remaining two tristimulus channels I-hue, Q-saturation may be kept unchanged until Y, I, Q are again recombined to get a new enhanced RGB picture.

3. (Box 350) Let $\{u^0{}_{ij}\}$ be the chosen channel. The upper index refers to the iteration number. At this point, the (unprocessed) image or signal may be displayed or otherwise output, as at box 360.

4. (Box 370) The edge indicator array is computed, for example, by applying a local edge-measuring integro-differential operator developed in Rudin, L., "Images: Numerical Analysis of Singularities and Shock Filters," Computer Science Department, Caltech, Pasadena, Calif., No. 5250:TR, which is incorporated herein by reference. Notice the value of the local detection measurement is given to every pixel $u_{ij}$ (i.e., not just a binary edge map). The edge indicator array may be also derived through the application of computationally cheaper edge detectors such as the zero-crossings of second order differential operators. In fact, it suffices to compute any L(u) such that it changes sign across the edge of the image. However, the quality of the restoration critically depends on the quality of this local edge measurement. Computational step 4 also includes the possibility of computing a singular feature measurement, which is different from the edge measurement. Namely, if restoration of lines or other singular features is important, line detection is used here, etc.

5. (Box 380) The edge indicator array is normalized with a proper discrete scaling as in (15e) or in (20).

6. (Box 390) Compute the first (and, on repeat iterations, the next) iteration of the enhanced signal by the two-dimensional scheme (17). This stage is the heart of the computation and is naturally extended to higher dimensional signals, such as multichannel signals. Thus, although a one-dimensional scheme is given in (9a), and a two-dimensional scheme is given in (17), the present method can naturally be extended to other modifications of (9a) and (17), which can be derived from the method and apparatus of shock filtering developed here. This step involves finding a difference scheme which is total variation preserving in one space dimension, is monotone when a value of the edge indicator is fixed, and satisfies the local maximum principle, and which involves the discretization of the nonlinear equation, in which the input signal is taken as the initial condition for the equations of 16a or 17.

7. (Decision Box 400) The convergence test is applied where the results of two consecutive iterations are compared in any reasonable norm, for instance in the max norm (i.e., the conventional $L_\infty$ norm), or in the standard $L_1$ norm, or some other norm. If the difference is smaller than a chosen number $\epsilon$, no more iterations are computed. Alternatively, the loop is exited if a preset number of iterations is exceeded. Meanwhile, enhanced forms of the signal may be displayed (as at box 410) as they are generated. As long as the decision box 400 yields a negative, n is increased by 1 in each loop (as at box 420) and the steps of boxes 370, 380, 390 and 400 are repeated.

8. (Box 430) When the convergence test is satisfied, the inverse color coordinate transform is computed: Y, I, Q→R, G, B, where new tristimulus values are derived from the new luminance Y array and (possibly old) I, Q arrays. If different color coordinates are used, the inversion is changed accordingly.

9. (Box 440) Finally, the enhanced signal is displayed on the output device (e.g., color CRT), and the method is thereby completed (box 450). As discussed above relative to the block diagram of FIG. 1, the output signal may be sent to a storage medium.

It will be apparent to those skilled in the art that many variations on the foregoing embodiments may be made without departing from the spirit and scope of the invention.

What is claimed is:

1. A method for performing edge-enhancement of an N-dimensional original image containing transitions corresponding to edges in said image, said transitions corresponding to different respective edge pixel values on respective sides of a given edge, so as to produce an edge-enhanced image in data processing apparatus of the type wherein said original image is represented by an array of pixels having respective pixel values, said method comprising the following steps:

(1.) propagating pixel value changes toward respective edges from all sides thereof in successive iterations while prohibiting propagation of the pixel value changes across any of said edges, each said successive iteration of said propagating step comprising:

(a) computing for each one of said dimensions a respective change in the value of each respective one of said pixels toward the corresponding edge pixel value in accordance with a difference between values of said one pixel and a neighboring pixel further away from an edge nearest said one pixel along said one dimension, (b) combining the changes computed for said one pixel for each of said dimensions to produce a combined pixel value change for said one pixel, and changing said original image in accordance with the combined pixel value changes of said pixels to produce an enhanced image, and substituting said enhanced image for said original image; and (2.) transmitting an enhanced image of a latest iteration to an image output device for one of displaying and recording of said enhanced image.

2. The method of claim 1 wherein said computing step comprises multiplying each difference by an edge detection function which changes sign across any edge in said image.

3. The method of claim 2 wherein said combining step comprises computing a sum of absolute values of the differences computed for all of said dimensions.

4. The method of claim 3 wherein said computing and combining steps comprise:

computing said differences in forward and backward directions along the respective dimension relative to the edge nearest said one pixel to produce forward and backward differences respectively for all pixels of said image along all dimensions of said image;

computing a sum of absolute values of positive terms of said forward differences and negative terms of said backward differences and multiplying said sum by negative terms of said edge detection function; and computing a sum of absolute values of negative terms of said forward differences and positive terms of said backward differences and multiplying said sum by positive terms of said edge detection function.

5. The method of claim 4 wherein said image is one-dimensional and said edge detection function corresponds to a second derivative.

6. The method of claim 4 wherein said image is multi-dimensional and said edge detection function corresponds to a component of a Laplacian operator.

7. The method of claim 4 wherein each of said edges corresponds to a zero-crossing in said image.

8. The method of claim 1 wherein said enhanced image has a total variation which is no greater than the total variation of said original image.

9. The method of claim 1 wherein said repeating is carried out until the differences between enhanced images of successive iterations is less than a predetermined threshold.

10. A system for performing edge-enhancement of an N-dimensional original image containing transitions corresponding to edges in said image, said transitions corresponding to different respective edge pixel values on respective sides of a given edge, so as to produce an edge-enhanced image, wherein said original image is represented by an array of pixels having respective pixel values, said system comprising:

(1.) means for propagating combined pixel value changes toward respective edges from all sides thereof in successive iterations while prohibiting propagation of the combined pixel value changes across any of said edges, said means for propagating comprising:

(a) means operative in each one of said successive iterations for computing for each one of said dimensions a respective change in the value of each respective one of said pixels toward the corresponding edge pixel value in accordance with a difference between values of said one pixel and a neighboring pixel further away from an edge nearest said one pixel along said one dimension, (b) means operative in each one of said successive iterations for combining the changes computed for said one pixel for each of said dimensions to produce a combined pixel value change for said one pixel, and for changing said original image in accordance with the combined pixel value changes of said pixels to produce an enhanced image, and for substituting said enhanced image for said original image; and (2.) means for transmitting an enhanced image of a latest iteration to an image output device for one of displaying and recording of said enhanced image.

11. The system of claim 10 wherein said means for computing comprises means for multiplying each difference by an edge detection function which changes sign across any edge in said image.

12. The system of claim 11 wherein said means for combining comprises means for computing a sum of absolute values of the differences computed for all of said dimensions.

13. The system of claim 12 wherein said means for computing and said means for combining comprise:

means for computing said differences in forward and backward directions along the respective dimension relative to the edge nearest said one pixel to produce forward and backward differences respectively for all pixels of said image along all dimensions of said image;

means for computing a sum of absolute values of positive terms of said forward differences and negative terms of said backward differences and multiplying said sum by negative terms of said edge detection function; and means for computing a sum of absolute values of negative terms of said forward differences and positive terms of said backward differences and for multiplying said sum by positive terms of said edge detection function.

14. The system of claim 13 wherein said image is one-dimensional and said edge detection function corresponds to a second derivative.

15. The system of claim 13 wherein said image is multi-dimensional and said edge detection function corresponds to a component of a Laplacian operator.

16. The system of claim 13 wherein each of said edges corresponds to a zero-crossing in said image.

17. The system of claim 10 wherein said enhanced image has a total variation which is no greater than the total variation of said original image.

18. The system of claim 10 wherein the number of said iterations is such that a last iteration is performed in which the differences between enhanced images of successive iterations is less than a predetermined threshold.

* * * * *